(12) United States Patent
Weigel

(10) Patent No.: US 7,137,703 B2
(45) Date of Patent: Nov. 21, 2006

(54) SHUTTER DEVICE FOR A CAMERA

(75) Inventor: Wolfgang Weigel, Ottobrunn (DE)

(73) Assignee: P+S Technik GmbH, Munich (DE)

( * ) Notice: Subject to any disclaimer, the term of this patent is extended or adjusted under 35 U.S.C. 154(b) by 149 days.

(21) Appl. No.: 10/952,018

(22) Filed: Sep. 27, 2004

(65) Prior Publication Data
US 2005/0117119 A1    Jun. 2, 2005

(30) Foreign Application Priority Data
Sep. 26, 2003 (DE) ................. 103 44 907

(51) Int. Cl.
*G03B 9/10* (2006.01)
(52) U.S. Cl. ............. 352/208; 352/210; 352/212; 352/214
(58) Field of Classification Search ......... 352/204–220
See application file for complete search history.

(56) References Cited

U.S. PATENT DOCUMENTS

| | | | | |
|---|---|---|---|---|
| 2,551,085 | A | * | 5/1951 | Bach ............ 352/166 |
| 3,124,033 | A | * | 3/1964 | Freudenschuss ...... 352/141 |
| 3,486,814 | A | * | 12/1969 | Kubota ............ 352/141 |
| 5,137,346 | A | * | 8/1992 | Sattler et al. ........ 352/216 |
| 5,850,277 | A | * | 12/1998 | Dang et al. ......... 352/214 |

FOREIGN PATENT DOCUMENTS

| | | |
|---|---|---|
| DE | 2132576.8 | 8/1972 |
| DE | 3902688 C2 | 11/1990 |
| DE | 2947333 C2 | 3/1991 |
| DE | 19609414 C1 | 7/1997 |
| EP | 0810465 A1 | 12/1997 |

* cited by examiner

*Primary Examiner*—Rodney Fuller
(74) *Attorney, Agent, or Firm*—Townsend and Townsend and Crew LLP

(57) ABSTRACT

A shutter device for a camera with an adjustable aperture comprises a connecting member for connection to a camera lens, the connecting member disposed along an optical axis; an image aperture disposed along an extension of the optical axis; and a reflective shutter and a shutter which are configured to cover the image aperture at least over a presettable period of time on a connection side of the image aperture facing the connecting member. The reflective shutter is disposed rotatably via a reflective shutter shaft, and the reflective shutter shaft is disposed perpendicularly to a plane of a reflective surface of the reflective shutter. The shutter is rotatably disposed via a shutter shaft, such that a combined shutter region results from projection in a direction of the optical axis to the image aperture, which is composed of a shutter region of the shutter and a shutter region of the reflective shutter.

20 Claims, 2 Drawing Sheets

SHUTTER DEVICE FOR A CAMERA

CROSS-REFERENCES TO RELATED APPLICATIONS

This application relates to and claims priority from German Patent Application No. 10344907.8, filed Sep. 26, 2003, the entire disclosure of which is incorporated herein by reference.

BACKGROUND OF THE INVENTION

The present invention relates to a shutter device for a camera having an adjustable aperture, including a connection for a camera lens, wherein an optical axis is defined by the connection, an image aperture disposed in the extension of the optical axis, and a reflective shutter and a shutter, being adapted to cover the image aperture at least over a pre-settable period of time on the connection side, wherein the reflective shutter is disposed rotatably via a reflective shutter shaft, and wherein the reflective shutter shaft is disposed perpendicularly to the plane of the reflective surface of the reflective shutter.

DE 196 09 414 A1 discloses a shutter used in a motion picture camera for ensuring light-tight cover of the motion picture film in single image exposures or long-term shots, respectively. The shutter can be reciprocated perpendicularly to the direction of transport of the motion picture film and to the optical axis of the camera lens, independently of the position of a reflective shutter.

The adjustment of the aperture of a video or film camera, optionally manually or automatically, is desired in order to be able to effect an adaptation to respective light conditions or for achieving desired effects. In this context, from DE 39 02 688 A1, a rotating shutter with an adjustment sector is known, wherein the adjustment sector is operated via an inherent adjusting motor, which is accommodated in the drive shaft of the rotating shutter. The power supply of the adjusting motor is effected through sliding contacts disposed on the drive shaft of the rotating shutter. This construction is disadvantageous in the complexity of the design: on the one hand, the adjusting motor has to be continually co-rotated, on the other hand, the adjusting motor can only be provided through sliding contacts prone to wear with current and control signals. Due to the great mass to be moved, the material requirements and hence the weight are high. As a result, the energy consumption is also undesirably high. The same applies to the adjustable rotating shutter described in DE 29 47 333.

Further, from EP 0 810 465, an adjustable rotating shutter is known, in which two mutually adjustable shutters are employed, wherein the two shutters are disposed coaxially closely lying one on top of the other. As will become more clear in the following, however, the space between the reflective shutter and the image aperture is very tightly dimensioned in practice, since the reflective shutter has to completely cover the image aperture for preventing light incidence, especially also in single image operation. Downsizing the reflective shutter would provide more space for a shutter assembly having two shutters, however accompanied by the disadvantage that thus, in the viewfinder, the entire image is no longer seen. The intercept distance of the back lens of the camera lens prevents the provision of space in the other direction. In the shutter device described there, moreover, the reflective shutter is always smaller than the smallest shutter region realizable with the two shutters. As a result, the reflective shutter is used only for the purposes of the viewfinder.

BRIEF SUMMARY OF THE INVENTION

Embodiments of the present invention provide the initially mentioned shutter device such that, with low weight, maximum viewfinder field, a reliable operation is made possible even with single image shots. Moreover, a corresponding viewfinder as well a corresponding camera are to be provided.

The inventors recognized that the previous problems can be solved if a shutter and a reflective shutter cooperate for generating a combined shutter region. That is, only two shutters are to be provided in the tightly dimensioned space in front of the image aperture. Since the reflective shutter does not need to be downsized, there is also the full image available in the viewfinder. Because the shutter and the reflective shutter are driven through separate shafts, the rotation of a motor can be omitted. In specific embodiments of the present invention, substantially only the shafts, on which the respective shutter is mounted, have to be rotated. As a consequence of the reflective shutter being able to be disposed very closely to the image aperture, also a single image operation with high quality is made possible.

A specific embodiment is characterized in that the rotational axis of the reflective shutter shaft intersects the optical axis in a first angle, which is preferably between about 40 and 60 degrees, more preferably at about 40 to 50 degrees. This measure allows for decoupling an image signal into a viewfinder or a recording device, for example, serving control purposes. Particularly compact designs are allowed if this angle is in the range of about 40 to 45 degrees.

Further, it is preferred if the rotational axis of the shutter shaft forms a second angle different from the first angle to the optical axis. It is especially preferred if the shutter shaft runs parallel to the optical axis, i.e., the second angle is 0 degree. Therefore, in the latter case, the shutter is disposed parallel to the image aperture and permits an extremely compact construction, as is apparent from FIG. 2, for example, which is discussed in more detail below.

Further, it is preferred if the pivot of the reflective surface of the reflective shutter is on the rotational axis of the shutter shaft. Otherwise, undesired unequal exposure along the image height would result.

For variation of the aperture, an adjusting device for adjusting the reflective shutter and the shutter with respect to each other is desirably provided. This adjusting device can be manually operable or equipped with automatic operation. In the latter case, for example for realizing effects, it can be provided to initiate the adjustment by means of button press, or to control the adjustment depending on the light passing through the image aperture. Measures for acquiring this light are known to one skilled in the art.

Advantageously, the adjusting device is in angular connection to a control device, wherein the control device is adapted to provide information to the adjusting device, in which the position of the reflective shutter and the position of the shutter with respect to the projection thereof to the image aperture is considered. This measure accommodates the circumstance that the combined shutter region has an edge formed by the shutter and an edge formed by the reflective shutter. Since the shutter and the reflective shutter are disposed in different inclinations to the optical axis, by the projection of the respective edges along the optical axis to the image aperture, an effective shutter region is achieved, which differs from the adjusted shutter region. In the control device, which desirably includes a microprocessor and a memory device, or has access to a microprocessor disposed in the film camera or a memory device disposed in the film camera, the relation between effective and adjusted shutter region can be stored, for example, in the form of an equation or also in the form of a look-up table. Therewith, a camera operator, for example, does not have to be concerned with this relation in performing an effect and can fully concentrate on the work. Also, in adaptation of the aperture to different light conditions, homogenous operation is ensured by this measure.

Finally, the drive of the shutter shaft is desirably synchronized with the drive of the reflective shutter shaft.

DETAILED DESCRIPTION OF THE INVENTION

Figure 1:
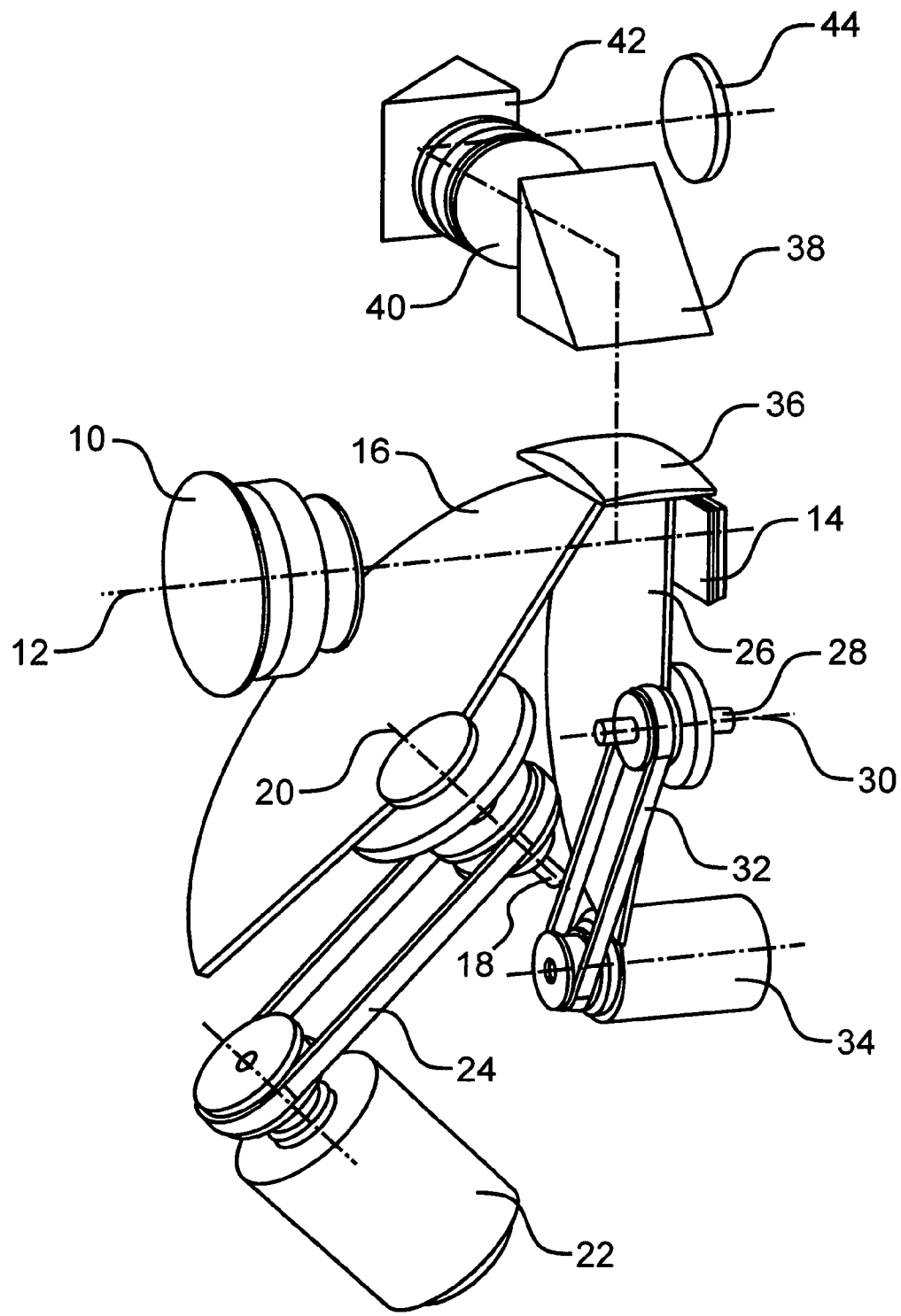
FIG. 1 is a schematic perspective view of a shutter device according to an embodiment of the present invention.

FIG. 1 shows in a schematic view an embodiment of a shutter device according to the invention. For clarity, only the components essential with regard to the description of the present invention are illustrated. By a connection or connecting member 10 for a camera lens, an optical axis 12 is defined, which passes through the center of the connection 10. In the extension of the optical axis, an image aperture 14 is illustrated. In case of a film camera, the image aperture 14 is the aperture opening, through which the film is exposed. In the case of a video camera, the image aperture 14 represents the image pick-up member, for example a CCD chip. Moreover, the shutter device has a reflective shutter 16, which can be rotated about a rotational axis 20 via a reflective shutter shaft 18. As a drive, an electromotor 22 is provided, which is coupled to the reflective shutter shaft 18 via a belt 24. Furthermore, a shutter 26 is provided, which is mounted on a shutter shaft 28, the rotational axis of which is designated by 30. The shutter shaft 28 is driven by an electromotor 34 via a belt 32. A portion of the light reflected by the reflective shutter 16 is provided to the operator in a viewfinder 44 via a ground glass plate 36, a first prism 38, optics 40 as well as a second prism 42. Accordingly, at the times, at which the reflective shutter 16 covers the image aperture 14, the operator can look through the camera lens mounted on the connection 10 via the viewfinder 44.

Figure 2:
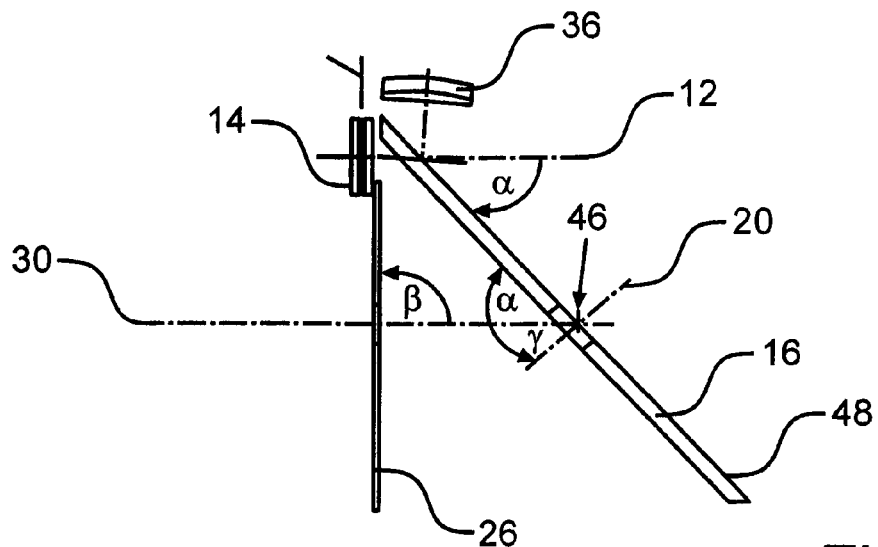
FIG. 2 is a schematic side view of individual parts of the shutter device of FIG. 1.

In the embodiment illustrated in FIG. 2, the shutter 26 is disposed perpendicularly to the optical axis 12. Therefore, the angle β is 90 degrees, i.e., the angle δ (not shown) between the optical axis 12 and the rotational axis 30 of the shutter shaft 28 is 0 degree. The reflective shutter 16 is inclined to the optical axis 12 at an angle α equal to 47.5 degrees. The angle γ, which the rotational axis 20 of the reflective shutter shaft 18 forms with respect to the optical axis 12, is therefore 42.5 degrees. As is apparent from this illustration, the pivot 46 of the reflective surface side 48 of the reflective shutter 16 is on the rotational axis 30 of the shutter shaft 28.

Figures 3A, 3B:
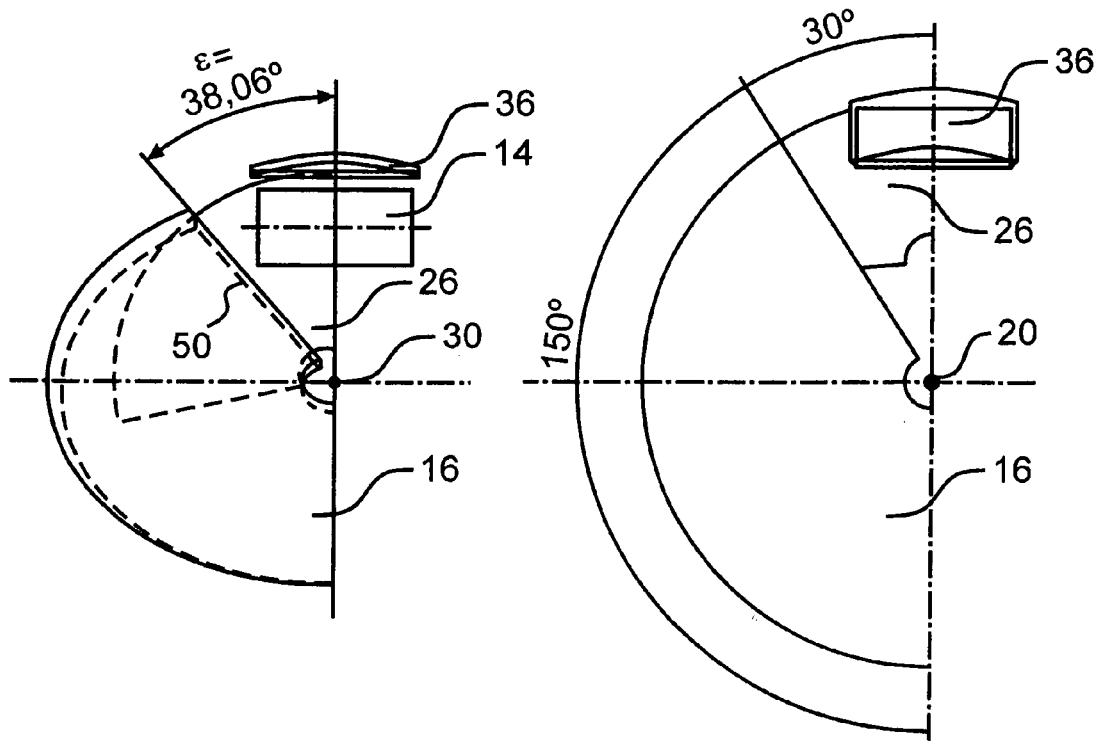
FIGS. 3a and 3b are schematic views illustrating the relation between adjusted and effective shutter region.

FIGS. 3a and 3b show exemplarily the realization of a combined shutter region of 180 degrees. FIG. 3a first shows a view to the reflective shutter 16, the shutter 26, the image aperture 14 as well as the ground glass plate 36 in the direction of the rotational axis 30 of the shutter shaft 28. FIG. 3b shows these elements in a view in the direction of the rotational axis 20 of the reflective shutter shaft 18. As is apparent from FIG. 3b, an effective combined shutter region of 180 degrees results. However, for this, as a result of the different orientation of the reflective shutter 16 and shutter 26, the shutter 26 must protrude beyond the edge 50 of the reflective shutter 16 by 38.06 degrees. For an angle γ equal to 42.5 degrees and a reflective shutter sector of 150 degrees (see FIG. 3b), the following table gives exemplarily the adjustment angle ε (see FIG. 3a) in order to realize the indicated combined effective shutter region:

| combined effective shutter region | angle ε |
|---|---|
| 150 | 0 |
| 151 | 1.36 |
| 152 | 2.71 |
| 153 | 4.07 |
| 154 | 5.42 |
| 155 | 6.77 |
| 156 | 8.11 |
| 157 | 9.46 |
| 158 | 10.79 |
| 159 | 12.12 |
| 160 | 13.45 |
| 165 | 19.97 |
| 170 | 26.27 |
| 175 | 32.31 |
| 180 | 38.06 |

This relation illustrated in the table is stored preferably either in the form of an equation or in the form of a look-up table in a control device 100, wherein the control device is in angular connection to an adjusting device 110 for adjusting the reflective shutter and the shutter with respect to each other.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A shutter device for a camera with an adjustable aperture, the shutter device comprising:
   a connecting member for connection to a camera lens, the connecting member being disposed along an optical axis;
   an image aperture disposed along an extension of the optical axis; and
   a reflective shutter and a shutter which are configured to cover the image aperture at least over a pre-settable period of time on a connection side of the image aperture facing the connecting member;
   wherein the reflective shutter is disposed rotatably via a reflective shutter shaft having a first rotational axis, and wherein the reflective shutter shaft is disposed perpendicularly to a plane of a reflective surface of the reflective shutter;
   wherein the shutter is rotatably disposed via a shutter shaft having a second rotational axis different from the first rotational axis, the reflective shutter and the shutter being arranged such that a combined shutter region results from projection in a direction of the optical axis to the image aperture, which is composed of a shutter region of the shutter and a shutter region of the reflective shutter; and wherein the shutter region of the reflective shutter by itself is at least as large as the shutter region of the shutter.

2. The shutter device of claim 1 wherein the first rotational axis of the reflective shutter shaft intersects the optical axis at a first angle.

3. The shutter device of claim 2 wherein the first angle is about 40–60 degrees.

4. The shutter device of claim 3 wherein the first angle is about 45 degrees.

5. The shutter device of claim 2 wherein the second rotational axis of the shutter shaft forms a second angle, different from the first angle, with respect to the optical axis.

6. The shutter device of claim 5 wherein the second angle is zero degree.

7. The shutter device of claim 1 wherein a pivot of the reflective surface of the reflective shutter is disposed on the second rotational axis of the shutter shaft.

8. The shutter device of claim 1 wherein the shutter region of the reflective shutter is about 150 degrees.

9. The shutter device of claim 8 wherein the combined shutter region is between about 150 degrees and about 180 degrees.

10. The shutter device of claim 1 further comprising an adjusting device configured to adjust the reflective shutter and the shutter with respect to one another to vary the image aperture.

11. The shutter device of claim 10 further comprising a control device operatively coupled with the adjusting device to provide information to the adjusting device to adjust the reflective shutter and the shutter with respect to one another to vary the image aperture, the information including relative positions of the reflective shutter and the shutter to provide a range of the combined shutter region from projection to the image aperture.

12. The shutter device of claim 11 wherein the information is represented by an equation or a look-up table.

13. The shutter device of claim 1 wherein a drive of the shutter shaft is synchronized with a drive of the reflective shutter shaft.

14. A viewfinder for a film camera with an adjustable aperture, the camera having a shutter device comprising:
a connecting member for connection to a camera lens, the connecting member being disposed along an optical axis;
an image aperture disposed along an extension of the optical axis; and
a reflective shutter and a shutter which are configured to cover the image aperture at least over a pre-settable period of time on a connection side of the image aperture facing the connecting member;
wherein the reflective shutter is disposed rotatably via a reflective shutter shaft having a first rotational axis, and wherein the reflective shutter shaft is disposed perpendicularly to a plane of a reflective surface of the reflective shutter;
wherein the shutter is rotatably disposed via a shutter shaft having a second rotational axis different from the first rotational axis, the reflective shutter and the shutter being arranged such that a combined shutter region results from projection in a direction of the optical axis to the image aperture, which is composed of a shutter region of the shutter and a shutter region of the reflective shutter; and
wherein the shutter region of the reflective shutter by itself is at least as large as the shutter region of the shutter.

15. A camera with an adjustable aperture, the camera having a shutter device comprising:
a connecting member for connection to a camera lens, the connecting member being disposed along an optical axis;
an image aperture disposed along an extension of the optical axis; and
a reflective shutter and a shutter which are configured to cover the image aperture at least over a pre-settable period of time on a connection side of the image aperture facing the connecting member;
wherein the reflective shutter is disposed rotatably via a reflective shutter shaft having a first rotational axis, and wherein the reflective shutter shaft is disposed perpendicularly to a plane of a reflective surface of the reflective shutter;
wherein the shutter is rotatably disposed via a shutter shaft having a second rotational axis different from the first rotational axis, the reflective shutter and the shutter being arranged such that a combined shutter region results from projection in a direction of the optical axis to the image aperture, which is composed of a shutter region of the shutter and a shutter region of the reflective shutter; and
wherein the shutter region of the reflective shutter by itself is at least as large as the shutter region of the shutter.

16. A shutter device for a camera with an adjustable aperture, the shutter device comprising:
an image aperture disposed along an optical axis of a camera lens to which the shutter device is to be coupled; and
a reflective shutter and a shutter which are configured to cover the image aperture at least over a pre-settable period of time on a side of the image aperture configured to face the camera lens;
wherein the reflective shutter is disposed rotatably via a reflective shutter shaft having a first rotational axis, and wherein the reflective shutter shaft is disposed perpendicularly to a plane of a reflective surface of the reflective shutter;
wherein the shutter is rotatably disposed via a shutter shaft having a second rotational axis;
wherein the reflective shutter and the shutter are arranged to provide a combined shutter region from projection in a direction of the optical axis to the image aperture, which is composed of a shutter region of the shutter and a shutter region of the reflective shutter; and
wherein the shutter region of the reflective shutter is at least as large as the shutter region of the shutter.

17. The shutter device of claim 16 wherein the first rotational axis of the reflective shutter shaft intersects the optical axis at a first angle; and wherein the second rotational axis of the shutter shaft forms a second angle, different from the first angle, with respect to the optical axis.

18. The shutter device of claim 16 wherein the shutter region of the reflective shutter is about 150 degrees; and wherein the combined shutter region is between about 150 degrees and about 180 degrees.

19. The shutter device of claim 16 further comprising an adjusting device configured to adjust the reflective shutter and the shutter with respect to one another to vary the combined shutter region projected to the image aperture.

20. The shutter device of claim 19 further comprising a control device operatively coupled with the adjusting device to provide information to the adjusting device to adjust the reflective shutter and the shutter with respect to one another to vary the combined shutter region projected to the image aperture, the information including relative positions of the reflective shutter and the shutter to provide a range of the combined shutter region from projection to the image aperture.

* * * * *